(12) United States Patent
Garcia et al.

(10) Patent No.: US 6,225,777 B1
(45) Date of Patent: May 1, 2001

(54) LATCHING MECHANISM FOR REMOVABLE CELL BATTERY PACK

(75) Inventors: Jorge L. Garcia, Plantation; Christopher D. Crawford, Tamarac; Larry K. Hooks, Jr., Lighthouse Point; Danielle P. Dzung, Coral Springs, all of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/578,364

(22) Filed: May 25, 2000

(51) Int. Cl.[7] ................. H02J 7/00; H01R 4/66
(52) U.S. Cl. .............. 320/112; D13/103; 429/100
(58) Field of Search ..................... 320/107, 112; D13/103; 429/97, 100

(56) References Cited

U.S. PATENT DOCUMENTS

| | | | |
|---|---|---|---|
| 5,314,763 | * | 5/1994 | Aksoy et al. ............................ 429/97 |
| 5,738,954 | * | 4/1998 | Latella et al. ........................... 429/97 |
| 5,857,148 | * | 1/1999 | Weishappel et al. ................... 455/90 |
| 6,014,010 | * | 1/2000 | Yao ....................................... 320/110 |
| 6,117,575 | * | 9/2000 | Dinsdale ................................ 429/1 |

* cited by examiner

*Primary Examiner*—Peter S. Wong
*Assistant Examiner*—Gregory J Toatley, Jr.
(74) *Attorney, Agent, or Firm*—Frank M. Scutch, III

(57) ABSTRACT

A latching mechanism is provided. The latching mechanism includes a first member (2) having a first catch (4) and lateral catches (6), and a second member (1) having a notch (7) and lateral catches (8). In a first position, the first catch of the first member engages the notch of the second member. In a second position, the lateral catches of the first member engage the lateral catches of the second member. Further, when in the first position, the first catch and the notch are disengaged by squeezing one of the members at lateral points while sliding the members relative to one another until the lateral catches are engaged and the members are in the second position. Also provided is a battery pack (1, 2) having such a latching mechanism. Additionally, there is provided an electronic device that includes an operational unit (3), a tray (2) for holding battery cells, and a cover (1). The tray is removably coupled to the operational unit, and the cover is removably coupled to the tray. In an operating position, the operational unit is latched to the tray, and the cover is latched to the tray. The cover can be slid from the operating position to a maintenance position in which the cover and tray are coupled together so that either the tray and cover can be removed from the operational unit together, or the cover can be slid further and removed from the tray while the tray remains latched to the operational unit.

23 Claims, 4 Drawing Sheets

LATCHING MECHANISM FOR REMOVABLE CELL BATTERY PACK

TECHNICAL FIELD

This invention relates in general to latching mechanisms, and more particularly to a latching mechanism for a removable cell battery pack.

DESCRIPTION OF THE PRIOR ART

As portable radios and other portable electronic devices increase in popularity, the need for improved battery packs for powering these devices increases dramatically. A removable-cell battery pack allows standard off-the-shelf cells (e.g., standard AA cells) to be used to power the device, in place of a rechargeable battery pack. This is highly advantageous, as the operator may frequently find himself in situations where the device cannot be recharged for long periods, such as when traveling. Depending on the particular electronic device, data may be lost when the available battery power is lost. Thus, it is critical to have surplus power available to prevent data loss and to ensure that the device has sufficient power available for handling unforeseen situations in which the device is needed.

For example, removable-cell battery packs can be particularly critical for providing longer lasting power to electronic devices in situations such as voyages at sea, travel into wilderness areas, and in military applications. These situations often demand frequent and prolonged use of electronic devices such as radios and global positioning systems (GPSs), so a battery pack that provides sufficient battery power is essential. These types of situations also demand a battery pack that is rugged and that can withstand impacts and other unforeseen abuses without disengaging from the electronic device and causing a loss of power. Disengagement of the battery pack from the electronic device also increases the risk of damage to the device and battery pack, and can cause battery cells to be lost or damaged.

A battery pack must have a latching mechanism that meets these demands, yet enables the battery cells to be efficiently accessed and easily replaced. Ideally, the battery pack should have enough versatility to allow battery replacement either while the battery pack is attached to the electronic device or while the two are separated. Conventional battery packs do not provide the desired combination of substantial impact resistance and efficient access to the battery compartment for easy battery cell replacement. For example, conventional electronic device and battery pack combinations are not capable of withstanding a four foot drop (as is often encountered in real-world situations) without the battery pack disengaging from the radio. Furthermore, conventional battery packs typically allow battery replacement either while the battery pack is attached to the electronic device or while they are separated, but do not offer the versatility of providing both options to the operator.

Thus, there is a need for an improved removable cell battery pack having a latching mechanism that is efficient in operation, simple in design, reliable, and inexpensive to manufacture. The improved latching mechanism should allow the battery pack to be easily latched to and unlatched from a radio or other electronic device, and should allow easy battery cell replacement, preferably either while the pack is attached to the electronic device or while the two are completely separated. Furthermore, the latching mechanism should enable the battery pack to sustain at least a four foot drop from any angle without the battery pack disengaging from the electronic device.

DESCRIPTION OF THE PREFERRED EMBODIMENTS

The present invention provides an improved latching mechanism for a removable cell battery pack. The invention can be applied to any portable radio or electronic communication device, and is particularly suited towards those having a rear mounting battery. The invention can also be applied to other portable electronic devices, such as portable computers, personal electronic organizers, electronic navigation devices (e.g., global positioning systems), and portable electronic medical devices. All of these have a need for auxiliary battery power and a battery pack that latches efficiently and securely to the electronic device. In the exemplary embodiment described in detail below, the battery pack is attached to a portable two-way radio communication device (radio).

One embodiment of the present invention provides a latching mechanism that includes a first member and a second member. The first member has a first catch and lateral catches, and the second member has a notch and lateral catches. In a first position, the first catch of the first member engages the notch of the second member. In a second position, the lateral catches of the first member engage the lateral catches of the second member. Further, when in the first position, the first catch and the notch are disengaged by squeezing one of the members at lateral points while sliding the members relative to one another until the lateral catches are engaged and the members are in the second position.

Another embodiment of the present invention provides a battery pack for an electronic device. The battery pack includes a tray and a cover. The tray has one portion of a first snap and lateral catches, and the cover has a corresponding portion of the first snap and lateral catches. In a first position, the first snap is engaged such that the portion of the first snap of the tray engages the portion of the first snap of the cover. In a second position, the lateral catches of the tray engage the lateral catches of the cover. When in the first position, the first snap is disengaged by squeezing the cover at lateral points while sliding the cover relative to the tray until the lateral catches are engaged and the tray and cover are in the second position.

Yet another embodiment of the present invention provides an electronic device that includes an operational unit, a tray for holding battery cells, and a cover. The tray is removably coupled to the operational unit, and the cover is removably coupled to the tray. In an operating position, the operational unit is latched to the tray, and the cover is latched to the tray. The cover can be slid from the operating position to a maintenance position in which the cover and tray are coupled together so that either the tray and cover can be removed from the operational unit together, or the cover can be slid further and removed from the tray while the tray remains latched to the operational unit.

Figure 1:
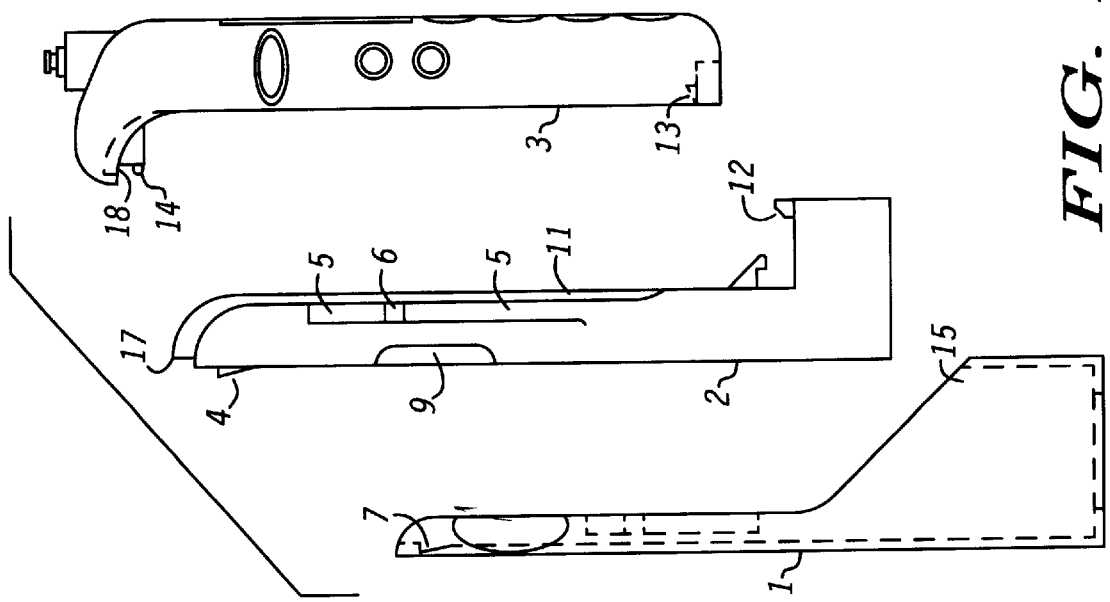
FIG. 1 is a diagram showing an exploded side view of a battery pack in accordance with a preferred embodiment of the present invention.

FIG. 1 shows an exploded view of a battery pack in accordance with one embodiment of the present invention. In this exemplary embodiment, the battery pack includes two parts, a cover 1 and a tray 2, that can be attached to a portable radio 3. As explained above, the battery pack is attachable various portable electronic devices in further embodiments. The tray 2 functions to hold the battery cells and to route electricity to the radio 3. In this exemplary embodiment, the tray 2 holds a total of 12 AA alkaline cells, with 11 of the cells being held in a cavity of the tray 2 that is opposite the radio 3 and the twelfth cell being held in a cavity located below the radio 3. The cover 1 retains all of the battery cells in the tray 2 and cups the radio 3 in the latched position to provide a secure attachment between the radio 3 and battery pack.

In particular, by forming an orifice that wraps completely around the lower portion of the tray 2, the cover 1 serves the dual purposes of retaining the twelfth battery cell that is held below the radio 3 and cupping the lower portion of the radio 3 in the latched position. This structure also allows the cover 1 to provide protection for the radio 3 such as increased impact resistance, and the secure attachment formed by the cover 1 cupping the lower portion of the radio 3 contributes to the ability of the battery pack to withstand a four foot drop without disengaging from the radio 3. Additionally, features such as a belt clip can be easily added to the cover 1 to provide the operator with a convenient way to carry the radio 3. The cover 1 can also serve as a stand to maintain the radio 3 and battery pack in the upright position when placed upon a flat surface.

Figure 2:
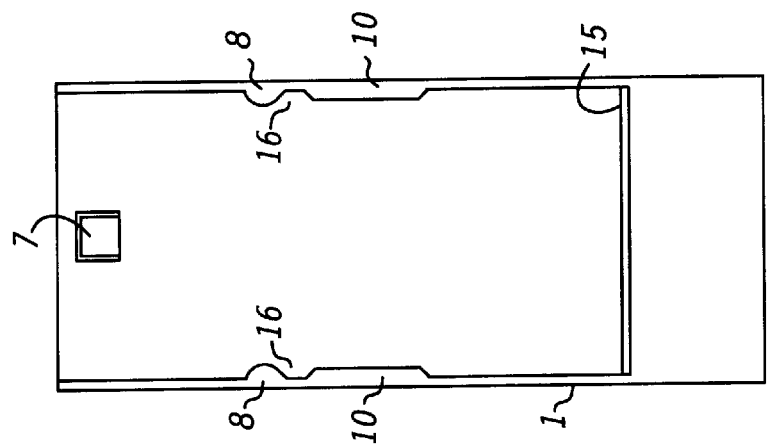
FIG. 2 is a diagram showing a front view of the cover of the battery pack illustrated in FIG. 1.

In the illustrated embodiment of the present invention, the tray 2 and cover 1 are attached to one another using an upper snap and two lateral snaps. FIG. 1 shows side views of the tray 2 and cover 1, and FIG. 2 shows a front view of the cover 1. The upper snap is formed by an upper catch 4 on the tray 2 and a notch 7 in the cover 1. Each of the two lateral snaps, with one being on each side of the pack, are formed by a lateral catch 6 on the tray 2, and a lateral catch 8 on the cover 1. When the tray 2 and cover 1 are in the latched position, the upper catch 4 of the tray 2 snaps into the notch 7 in the cover 1. The upper catch 4 can be disengaged from the notch 7 by squeezing the cover 1.

Figure 4:
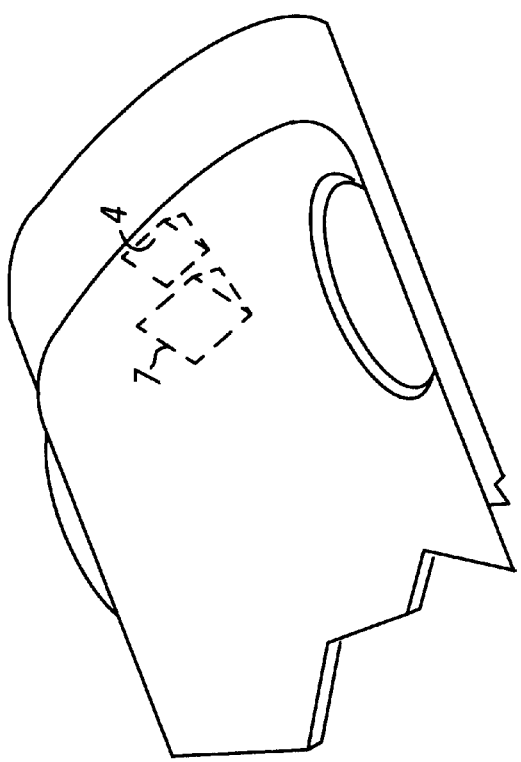
FIG. 4 is a diagram showing the cover and tray of the battery pack with the upper snap in the disengaged position.
Figure 3:
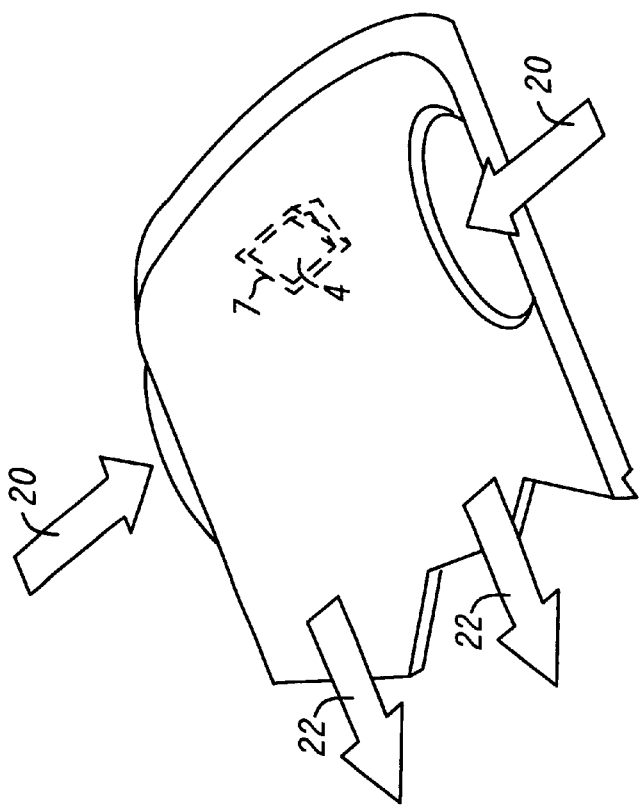
FIG. 3 is a diagram showing the cover and tray of the battery pack illustrated in FIG. 1 with the upper snap in the engaged position.

More specifically, squeezing the sides of the cover 1 causes the cover 1 to bow outward at the latching point away from the upper catch 4, and thus disengages the upper catch 4 of the tray 2 from the notch 7 in the cover 1. In preferred embodiments, the cover 1 is constructed of plastic or other flexible material that can be easily bowed by squeezing. FIG. 3 shows the tray 2 and cover 1 with the upper snap in the engaged position. A first set of arrows 20 indicates the squeeze points on the cover 1. By squeezing approximately at these points, the snap 4 and 7 is disengaged so as to allow the cover 1 to be slid downward relative to the tray 2, as indicated by a second set of arrows 22. The tray 2 and cover 1 are shown with the upper snap in the disengaged position in FIG. 4. As shown, the upper snap 4 and 7 is disengaged and the cover 1 has been slid slightly downward relative to the tray 2. In this position, the two lateral snaps engage one another.

Figure 6:
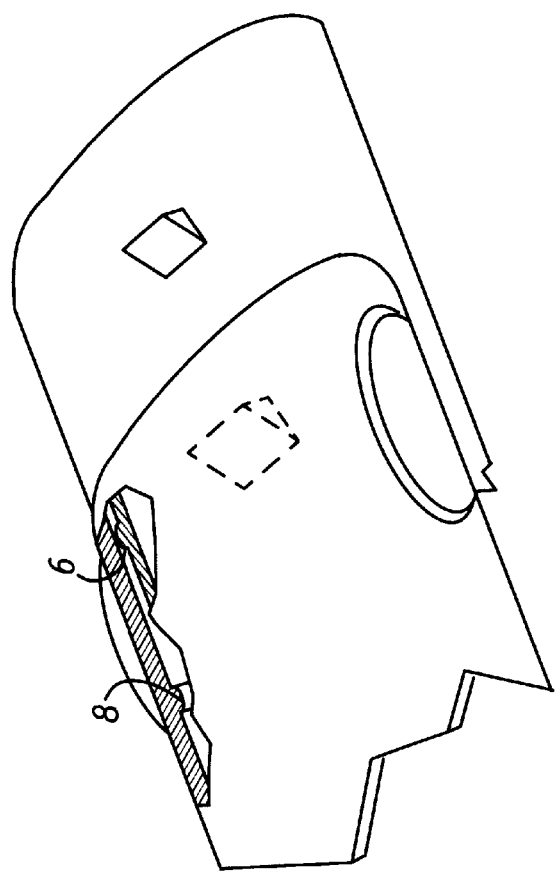
FIG. 6 is a diagram showing the cover and tray of the battery pack with the lateral snaps in the engaged position.
Figure 5:
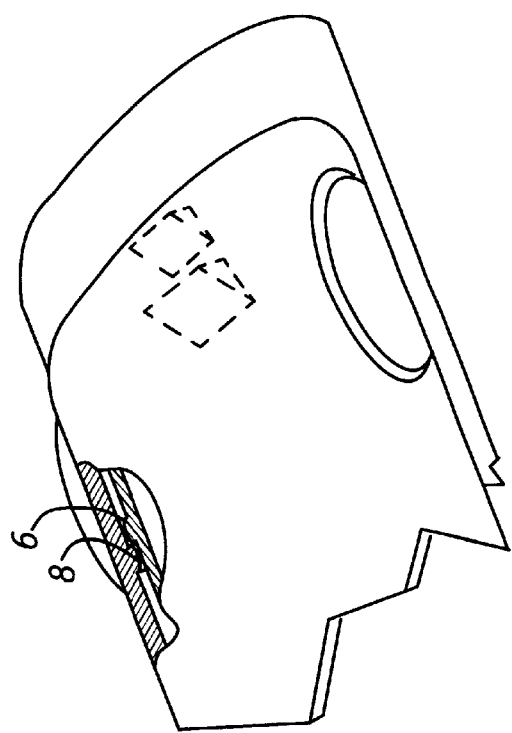
FIG. 5 is a diagram showing the cover and tray of the battery pack illustrated in FIG. 1 with the lateral snaps in the disengaged position.

FIG. 5 shows the tray 2 and cover 1 in the latched position with the lateral snaps in the disengaged position. With the tray 2 and cover 1 in the latched position, the upper snap 4 and 7 is engaged (FIG. 3) and the lateral snaps 6 and 8 are disengaged, as shown in FIG. 5. When the upper snap 4 and 7 is disengaged by squeezing and the cover 1 is slid downward, the lateral snaps 6 and 8 engage one another, as shown in FIG. 6. When the lateral catches 6 on the tray 2 and the lateral catches 8 on the cover 1, which form the lateral snaps, engage one another, the tray 2 and cover 1 are prevented from sliding further apart. More specifically, the lateral catches 8 on the cover 1 are on the inside of the cover 1 and point inward, and the lateral catches 6 on the tray 2 are on the outside of the tray 2 and point outward.

Additionally, the cover 1 and tray 2 are aligned with one another through a guide that is formed by grooves 5 and ridges 9 and 11 on the tray 2 and ridges on the cover 1. When the cover 1 is squeezed, the tray 2 slides inside the cover 1 and the lateral catches 6 and 8 engage each other. The ridge 10 and lateral catch 8 on the cover 1 slide into the groove 5 in the tray 2, which is located between the ridges 9 and 11 on the tray 2. The lateral catch 8 of the cover 1 then rests in the upper portion of the groove 5 above the lateral catch 6 of the tray 2, and the lateral catch 6 of the tray 2 rests at a position 16 in the cover 1 that is between the lateral catch 8 and the ridge 10.

The portion of the groove 5 in the tray 2 above the lateral catch 6 provides a range of motion to allow the lateral catch 8 of the cover 1 to move between an upward position in which the upper snap is engaged and a downward position in which the lateral snaps are engaged. Similarly, the position 16 between the lateral catch 8 and ridge 10 of the cover 1 provides a range of motion to allow the lateral catch 6 of the tray 2 to move between a downward position in which the ridge 10 of the cover 1 is engaged (when the upper snap is engaged) and an upward position in which the lateral catch 8 of the cover 1 is engaged (when the upper snap is disengaged). Although a range of motion is provided for, the cover 1 and tray 2 are held securely together when the lateral snaps are engaged, even though the upper snap is disengaged.

In particular, when the cover 1 is squeezed and slid to disengage the upper snap, the lateral catch 6 of the tray 2 engages the lateral catch 8 of the cover 1 to prevent further downward movement of the cover 1 relative to the tray 2. The upper catch 4 of the tray 2 then provides resistance against the upper edge of the cover 1 to prevent the cover 1 from easily sliding upward relative to the tray 2. Additionally, the interlocking of the ridge 10 of the cover 1 in the groove 5 between the ridges 9 and 11 in the tray 2 prevents the tray 2 and cover 1 from separating. These interactions serve to securely hold the tray 2 and cover 1 together when the upper snap is disengaged, in order to allow the battery pack to be pivoted out and removed from the radio 3 as a whole. These interactions also contribute to the substantial impact resistance of the battery pack.

The lateral catch 6 of the tray 2 is provided in the recess of the groove 5. Thus, the squeezing of the cover 1 to disengaged the upper snap causes the lateral catches 8 of the cover 1 to be bowed inward and engage the lateral catches 6 of the tray 2. In other words, when the cover 1 is squeezed and slid to disengage the upper snap, the lateral catches 6 and 8 engage to stop the downward movement of the cover 1 relative to the tray 2. To separate the cover 1 and tray 2, squeezing of the cover 1 is ceased to cause the lateral catches 8 of the cover 1 to flex slightly outward and away from the lateral catches 6 of the tray 2. At this point, the flexible properties of the cover 1 allow the lateral catches 6 and 8 to be pushed past one another by applying a small downward force on the cover 1. When the lateral catch 8 of the cover 1 is slid over and past the lateral catch 6 on the tray 2, the cover 1 is separated from the tray 2 to allow access to the battery compartment of the tray 2 while the tray 2 remains attached to the radio 3.

To reattach the cover 1 to the tray 2, the lateral catches 8 of the cover 1 are placed in the groove 5 in the tray 2, and force is applied to move the cover 1 upward relative to the tray 2. The force causes the lateral catches 8 of the cover 1 to flex slightly outward and slide past the lateral catches 6 of the tray 2. In this position, the lateral catch 6 of the tray 2 rests in the position 16 between the lateral catch 8 and ridge 10 of the cover 1, and the lateral catch 8 of the cover 1 is positioned in the upper portion of the groove 5 in the tray 2 (above the lateral catch 6). By applying further upward force to overcome the resistance to upward movement provided by the upper catch 4, the cover 1 can be slid upward until the upper snap engages to tightly secure the cover 1 to the tray 2.

Figure 8:
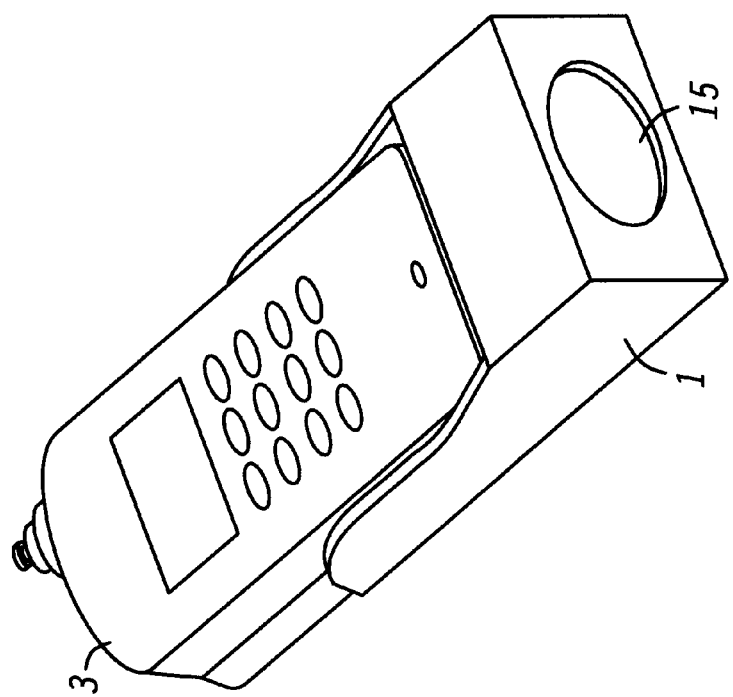
FIG. 8 is a diagram showing the battery pack unlatched from the radio device.
Figure 7:
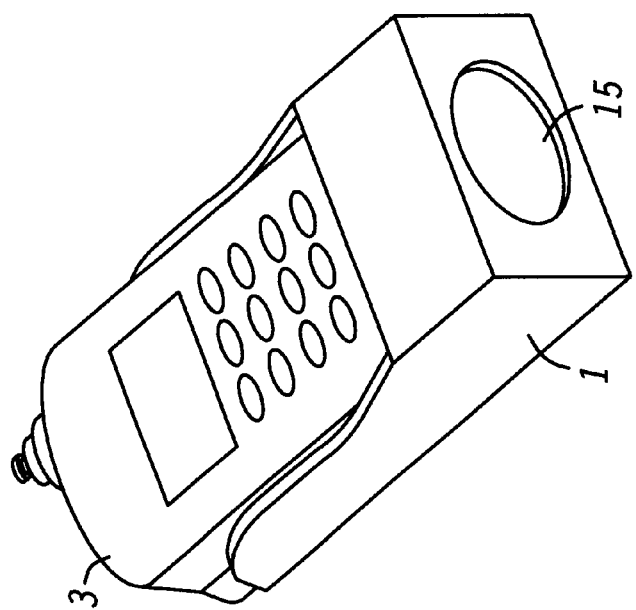
FIG. 7 is a diagram showing the battery pack illustrated in FIG. 1 latched to a radio device.

FIG. 7 shows the battery pack of the preferred embodiment latched to a radio 3 with the cover 1 cupping the radio 3. When the upper snap is engaged, the battery pack is latched to the radio 3 by sliding the radio 3 downward into the orifice 15 until the cover 1 slightly overlaps the front bottom portion of the radio 3. This cupping of the radio 3 by a portion of the cover 1 prevents disengagement of the battery pack from the radio 3. When the cover 1 is slid downward to disengage the upper snap and engage the lateral snaps, the movement places the radio 3 sufficiently far upward (relative to the cover 1) to be removed from the orifice and no longer overlapped by the cover 1, as shown in FIG. 8.

In this exemplary embodiment, the radio 3 and tray 2 are attached together through protrusions 13 and 14 on the radio 3. To secure the top of the radio 3, an upper lip 17 of the tray 2 is inserted under an upper lip 18 of the radio 3, and the upper protrusions 14 on the radio 3 snap into cavities in the upper lip 17 of the tray 2. The bottom of the radio 3 is secured by snapping the lower protrusions 13 on the radio 3 into corresponding cavities in the tray 2, while a lower catch 12 on the tray 2 engages the front of the radio 3. This structure allows the tray 2 to remain securely attached to the radio 3 when the cover 1 is removed. With the cover 1 slid down to the position in which the lateral snaps are engaged (or with the cover 1 completely separated from the tray 2), the radio 3 can be unlatched from the tray 2 by applying enough force to overcome the resistance of lower catch 12 and pivot the bottom of the radio 3 away from the tray 2.

Thus, either the battery pack can be removed from the radio 3 as a whole, or the cover 1 can be removed from the tray 2 while the tray 2 remains attached to the radio 3. More specifically, when the upper snap is engaged, the radio 3 and battery pack are in the latched position. The cover 1 cups the bottom front portion of the radio 3 to securely hold the radio 3 in place and prevent the radio 3 from being disengaged from the battery pack. This structure also provides substantial impact resistance. Thus, in preferred embodiments, the unit can be dropped four feet at any angle without disengaging the battery pack from the radio 3.

By squeezing the upper sides of the cover 1 to disengage the upper snap, the cover 1 can be slid to an intermediate position in which the radio 3 is no longer cupped by the cover 1. During the disengagement of the upper snap, the lateral snaps limit the initial movement of the cover 1 at the intermediate position. From this position, either the cover 1 can be removed by itself, or the cover 1 and tray 2 can be removed from the radio 3 as a whole. Removing the cover 1 from the tray 2 gives the operator access to the battery cells in the tray 2. Thus, the battery cells can be replaced either with the tray 2 remaining attached to the radio 3 or with the entire battery pack (both the cover 1 and tray 2) completely separated from the radio 3.

The present invention offers significant advantages over conventional battery packs. For example, preferred embodiments of the present invention provide an efficient two position latching mechanism. The mechanism allows either the battery pack to be removed from the radio 3 as a whole, or the cover 1 to be slid off the tray 2 while the tray 2 remains attached to the radio 3. This allows easy replacement of the battery cells either while the tray 2 is attached to the radio 3 or while the battery pack is completely separated from the radio 3. Thus, rapid replacement of a complete set of battery cells is possible by quickly swapping a battery pack with an additional battery pack that has been pre-loaded with charged batteries. This feature is advantageous because replacing batteries in the battery pack one-by-one can be time consuming, and could be critical in situations requiring rapid battery cell replacement, such as in military applications, in medical applications, and when the device is used in the dark or under other extreme conditions. Furthermore, the present invention is simple in design and preferred embodiments are formed of only two parts, the tray 2 and the cover 1. Thus, costs are kept low while reliability remains high. Further, the present invention provides secure latching and impact resistance, with preferred embodiments being able to withstand a four foot drop from any angle without unlatching.

Although specific embodiments of the invention have been disclosed, it will be understood by those having ordinary skill in the art that changes can be made to the specific embodiments without departing from the spirit and scope of the invention. Furthermore, embodiments of the present invention may not include all of the features described above. The scope of the invention is not to be restricted, therefore, to the specific embodiments, and it is intended that the appended claims cover any and all such applications, modifications, and embodiments within the scope of the present invention.

What is claimed is:

1. A latching mechanism for use with an electronic device, said latching mechanism comprising:

a first member having a first catch; and a second member having a notch corresponding in position to the first catch of the first member, wherein in a first position, the first catch of the first member engages the notch of the second member, the second member has a region forming an orifice such that the second member overlaps the first member and an end portion of the electronic device in the first position so as to prevent the electronic device and the first and second members from being separated, and when in the first position, the first catch and the notch are disengaged by squeezing one of the first and second members at lateral points while sliding the members relative to one another until the members are in a second position.

2. The latching mechanism as defined in claim 1, wherein in the second position, the second member does not overlap the end portion of the electronic device so as to allow the electronic device to be separated from the first and second members.

3. The latching mechanism as defined in claim 2, wherein in the second position, either the first member and the second member can be removed from the electronic device together, or the second member can be removed from the first member while the first member remains latched to the electronic device.

4. The latching mechanism as defined in claim 1,
wherein the first member also includes lateral catches,
the second member also includes lateral catches corresponding in position to the lateral catches of the first member, and
in the second position, the lateral catches of the first member engage the lateral catches of the second member.

5. The latching mechanism as defined in claim 4, wherein when in the second position, the lateral catches are disengaged by ceasing squeezing of the one member and applying a sufficient force to allow the lateral catches of the first and second members to slide past one another.

6. The latching mechanism as defined in claim 4, wherein in the second position, the lateral catches of the first and second members engage one another to resist movement of the second member in one direction relative to the first member, and the first catch of the first member provides resistance against the second member to resist movement of the second member in an opposite direction relative to the first member.

7. The latching mechanism as defined in claim 6, wherein the first member slides inside the second member, and the lateral catches of the first member point outward and the lateral catches of the second member point inward.

8. The latching mechanism as defined in claim 1,
wherein the second member is constructed of a flexible material, and
squeezing the second member at points lateral to the notch causes the second member to bow outward away from the first catch in order to disengage the first catch and the notch.

9. A battery pack for an electronic device, said battery pack comprising:
a tray having one portion of a first snap and lateral catches; and
a cover having a corresponding portion of the first snap and lateral catches corresponding in position to the lateral catches of the tray,
wherein in a first position, the first snap is engaged such that the portion of the first snap of the tray engages the portion of the first snap of the cover,
in a second position, the lateral catches of the tray engage the lateral catches of the cover, and
when in the first position, the first snap is disengaged by squeezing the cover at lateral points while sliding the cover relative to the tray until the lateral catches are engaged and the tray and cover are in the second position.

10. The battery pack as defined in claim 9, wherein when in the second position, the lateral catches are disengaged by ceasing squeezing of the cover and applying a sufficient force to allow the lateral catches of the cover and tray to slide past one another.

11. The battery pack as defined in claim 9, wherein in the second position, the lateral catches of the cover and tray engage one another to resist movement of the cover in one direction relative to the tray, and the portion of the first snap of the tray provides resistance against the cover to resist movement of the cover in an opposite direction relative to the tray.

12. The battery pack as defined in claim 11, wherein the tray slides inside the cover, and the lateral catches of the tray point outward and the lateral catches of the cover point inward.

13. The battery pack as defined in claim 9, wherein the tray holds battery cells and routes electricity to the electronic device.

14. The battery pack as defined in claim 9, wherein the cover has a region forming an orifice such that the cover overlaps the tray and an end portion of the electronic device in the first position so as to prevent the electronic device and battery pack from being separated.

15. The battery pack as defined in claim 14, wherein in the second position, the cover does not overlap the electronic device so as to allow the electronic device to be separated from the battery pack.

16. The battery pack as defined in claim 15, wherein in the second position, either the tray and cover can be removed from the electronic device together, or the cover can be removed from the tray while the tray remains latched to the electronic device.

17. An electronic device comprising:
an operational unit;
a tray for holding battery cells, the tray being removably coupled to the operational unit; and
a cover removably coupled to the tray,
wherein in an operating position, the operational unit is latched to the tray, and the cover is latched to the tray,
the cover can be slid from the operating position to a maintenance position, and
in the maintenance position, the cover and tray are coupled together so that either the tray and cover can be removed from the operational unit together, or the cover can be slid further and removed from the tray while the tray remains latched to the operational unit.

18. The electronic device as defined in claim 17, wherein the cover has a region forming an orifice such that the cover overlaps the tray and an end portion of the operational unit in the operating position so as to prevent the operational unit, tray, and cover from being separated.

19. The electronic device as defined in claim 18, wherein in the maintenance position, the cover does not overlap the operational unit so as to allow the operational unit to be separated from the battery pack.

20. The electronic device as defined in claim 17,
wherein the tray has one portion of a first snap and lateral catches,
the cover has a corresponding portion of the first snap and lateral catches corresponding in position to the lateral catches of the tray,
in the operating position, the first snap is engaged such that the portion of the first snap of the tray engages the portion of the first snap of the cover, and
in the maintenance position, the lateral catches of the tray engage the lateral catches of the cover.

21. The electronic device as defined in claim 20, wherein when in the operating position, the first snap is disengaged by squeezing the cover at lateral points while sliding the cover relative to the tray until the lateral catches are engaged and the tray and cover are in the maintenance position.

22. The electronic device as defined in claim 21, wherein when in the maintenance position, the lateral catches are disengaged by ceasing squeezing of the cover and applying a sufficient force to allow the lateral catches of the cover and tray to slide past one another.

23. The electronic device as defined in claim 17, wherein the operational unit is a portable two-way communication device.

* * * * *